United States Patent [19]

Sekiguchi et al.

[11] Patent Number: 4,635,774
[45] Date of Patent: Jan. 13, 1987

[54] ELECTROMAGNETIC COUPLING DEVICE

[75] Inventors: Yuzo Sekiguchi; Enjiro Maejima, both of Kiryu, Japan

[73] Assignee: Ogura Clutch Co., Ltd., Gunma, Japan

[21] Appl. No.: 716,059

[22] Filed: Mar. 26, 1985

[30] Foreign Application Priority Data

Mar. 28, 1984 [JP] Japan .................. 59-58195

[51] Int. Cl.$^4$ ............................................. F16D 27/10
[52] U.S. Cl. ................................. 192/52; 192/84 C; 192/106.1
[58] Field of Search ............ 192/40, 84 A, 84 B, 192/84 C, 52, 70.28, 106.1; 188/161

[56] References Cited

U.S. PATENT DOCUMENTS

| | | | |
|---|---|---|---|
| 3,055,475 | 9/1962 | Pitts, Jr. .................... | 192/84 C |
| 3,092,307 | 6/1963 | Heidhorn ................... | 192/84 A |
| 3,190,419 | 6/1965 | Heidhorn ................... | 192/84 B |
| 4,337,855 | 7/1982 | Bennett ..................... | 192/84 A |
| 4,471,860 | 9/1984 | Yamada ..................... | 192/84 C |
| 4,493,407 | 1/1985 | Newton ..................... | 192/84 C |
| 4,498,066 | 2/1985 | Fujiwara et al. ............ | 192/84 C X |

FOREIGN PATENT DOCUMENTS 22293 11/1972 Japan .
44227 4/1981 Japan .

Primary Examiner—Rodney H. Bonck
Assistant Examiner—Richard M. Lorence
Attorney, Agent, or Firm—Townsend & Townsend

[57] ABSTRACT

An electromagnetic coupling device is configured so that divided armatures disposed opposite to an electromagnetic flux producing member are magnetically attracted in a stepwise manner. When applied to an electromagnetic clutch, the coupling device comprises an output pulley serving as the magnetic flux producing member provided with a yoke in which an excitation coil is incorporated, an input pulley disposed coaxially with the output pulley and adapted to be coupled therewith when the excitation coil is energized, and a plurality of annular armatures adapted to be fastened to the input pulley and having diameters different from each other. The coupling device further comprises armature supporting leaf springs provided on an axial end of the input pulley and elastically supporting the armatures in such a manner that they are disposed concentrically with the input pulley and are spaced in an axial direction with respect to the output pulley through magnetic gaps, and detour magnetic flux adjusting portions formed on an axial end of the output pulley. The dimensions of the adjusting portions and the lengths of the magnetic gaps vary in a stepwise manner with respect to the armatures, respectively, thus providing an excellent progressive coupling between the magnetic flux producing member and the armatures.

4 Claims, 10 Drawing Figures

ELECTROMAGNETIC COUPLING DEVICE

BACKGROUND OF THE INVENTION

The present invention relates to an electromagnetic coupling device used in an electromagnetic clutch for transmitting power, an electromagnetic brake for braking power, or the like. Specifically, the present invention is concerned with an electromagnetic clutch configured so that divided armatures are attracted magnetically in a stepwise manner, thus providing a progressive coupling between a magnetic flux producing member and armatures.

Electromagnetic clutches or electromagnetic brakes have been widely used for computer peripheral equipment, copy machines facsimiles devices and the like as their quality and performance have been recently improved. in addition, in an electromagnetic clutch or the like for a car cooler which is mounted on an automotive vehicle and transmits engine power to a compressor, it is required to transmit engine torque suitably damped for preventing a load to the the engine from being suddenly changed.

An electromagnetic clutch as disclosed in Japanese Utility Model Publication No. 47-22293 is typical of an electromagnetic clutch having such a damping function. This electromagnetic clutch is provided with an electromagnet comprising an excitation coil and a yoke for clamping the excitation coil disposed within a drive rotor to magnetically attract armatures comprising external and internal poles and supported by hubs by means of two spring plates having different spring constants.

Conventional electromagnetic coupling devices of this kind have the following drawback; it is impossible to exert a necessary attraction force to an armature first attracted by an magnetomotive force produced by the excitation coil. As a result, a torque rising characteristic in the armature first attracted is degraded. For this reason, it is unable to obtain a damping action for providing a desired progressive coupling between the drive rotor and the armatures.

Another conventional electromagnetic clutch having the above-mentioned damping function is disclosed in Japanese Utility Model Application Laid-open No. 56-44227. This electromagnetic clutch is configured such that there are formed different lengths of magnetic gaps between a friction surface of a rotor to which a V-shaped pulley is fastened and radially positioned inner and outer armatures, whereby the outer armature is forcedly moved by utilizing projections formed at the respective armatures when the inner armature is magnetically attracted. In this instance, armatures have thicknesses different from each other in order to obtain different lengths of the magnetic gaps.

However, since this electromagnetic clutch is configured so as to vary attraction forces exerted on the armatures only by adjusting magnetic gaps, it is difficult to overcome the drawbacks encountered in the first-mentioned conventional electromagnetic clutch. Namely, this electromagnetic clutch fails to suitably adjust an amount of magnetic flux toward localized armatures, although such an adjustment is necessarily required in order to attract them in a stepwise manner. Accordingly, the last-mentioned electromagnetic clutch is also not practically acceptable.

SUMMARY OF THE INVENTION

With the above in view, an object of the present invention is to provide an electromagnetic coupling device which can overcome the drawbacks with the prior art ones.

Another object of the present invention is to provide an electromagnetic coupling device which can provide a progressive coupling between a magnetic flux producing member and a plurality of armatures with a quite simplified construction.

A further object of the present invention is to provide an electromagnetic coupling device which can provide a desired attraction force when an armature to be first attracted is attracted by providing means for adjusting an amount of detour magnetic flux in a stepwise manner with respect to respective armatures.

A still further object of the present invention is to provide an electromagnetic coupling device which further effectively utilizes the above-mentioned attraction force by adjusting magnetic gaps between a magnetic flux producing member and armatures and/or spring constants of armature supporting members in a stepwise manner with respect to respective armatures.

A still further object of the present invention is to provide an electromagnetic coupling device which can decrease the number of parts by employing a multibranch leaf spring as the armature supporting member, thereby to lessen assembling steps.

According to the present invention, there is provided an electromagnetic coupling device comprising first annular means serving as magnetic flux producing means provided with a yoke in which an excitation coil is incorporated, second annular means disposed coaxially with said first means and adapted to be coupled therewith when the excitation coil is energized, a plurality of annular armatures adapted to be fastened to the second means, said armatures having diameters different from each other, armature supporting means provided on an axial end of the second means and elastically supporting said armatures in such a manner that the armatures are disposed concentrically with the first means and are spaced in an axial direction with respect to the first means through magnetic gaps, and detour magnetic flux adjusting portions formed on an axial end of the first means, the adjusting portions having dimensions different in a stepwise manner with respect to the respective armatures, the magnetic gaps having lengths different in a stepwise manner with repect to the respective armature.

When the coupling device of the invention is applied to an electromagnetic clutch, the first annular means may comprise first power transmission means rotatably supported in a manner that power is transmitted from an external power source, the first power transmission means serving as magnetic flux producing means provided with a yoke in which an excitation coil is incorporated, and the second annular means may comprise second power transmission means rotatably supported by an apparatus to which power is to be transmitted, the second power transmission means being disposed coaxially with the first power transmission means and adapted to be coupled therewith when the excitation coil is energized. Thus, the coupling device effects a progressive coupling between first and second power transmission means to transmit the power from the power source to the apparatus through the first and second power transmission means by employing the electromagnetic coupling device as an electromagnetic clutch.

The armature supporting means may be provided with top end portions which branch so as to correspond to the number of the armatures, spring constants of the branch top end portions being different in a stepwise manner with respect to the respective armatures.

The armature supporting means may be comprised of a plurality of leaf springs.

The plurality of leaf springs may be arranged circumferentially equidistantly on the axial end of the second means.

The detour magnetic flux adjusting portions may be concentrically and annularly formed.

Each of the detour magnetic flux adjusting portions may be comprised such as a non-magnetic member of copper or resin. The detour magnetic flux adjusting portions may be interposed between external and internal annular portions of the first means.

The detour magnetic flux adjusting portions may have widths in a radial direction and depths which decrease in a stepwise manner toward an internal or external direction.

The armatures may have thicknesses which decrease in a stepwise manner toward an internal or external direction.

The leaf spring may be sector-shaped and comprises a plurality of concentric curved branch portions having the same widths and diameters different from each other.

The armatures may have the same thickness, and stoppers for receiving the armatures may have thicknesses which decrease toward an internal or external direction, thus providing magnetic gaps different in a stepwise manner.

The detour magnetic flux adjusting portions may be formed with concentric curved slots having diameters different from each other.

The curved slots may have widths and lengths which decrease toward an internal or external direction. Non-magnetic material may be filled into each of the curved slots.

When power is transmitted from an electric motor to the second means, the electromagnetic coupling device may serve as an electromagnetic brake by employing the first means as a stationary member.

BRIEF DESCRIPTION OF THE DRAWINGS

The features and advantages of an electromagnetic coupling device according to the present invention will become more apparent from the following description taken in conjunction with the accompanying drawings, in which.

DETAILED DESCRIPTION OF PREFERRED EMBODIMENTS

A preferred embodiment where the present invention is applied to an electromagnetic clutch will be described with reference to attached drawings.

Figure 1:
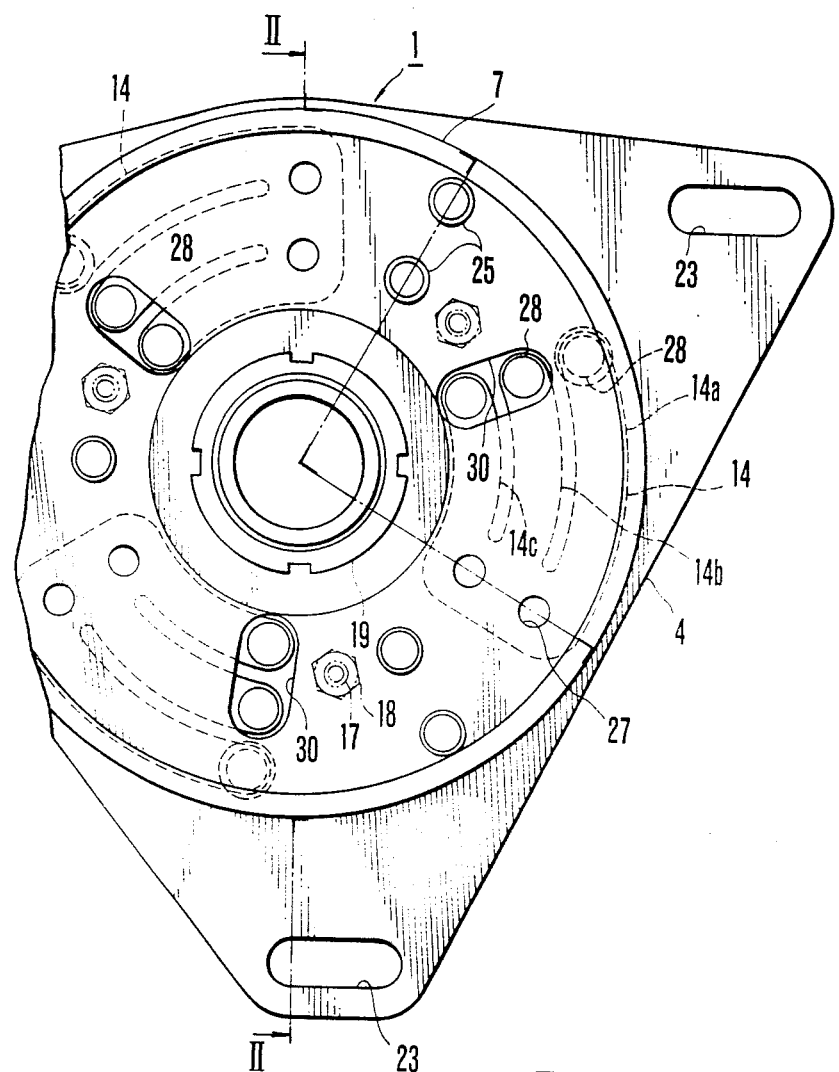
FIG. 1 is a front view illustrating an embodiment where an electromagnetic coupling device according to the present invention is employed as an electromagnetic clutch.
Figure 2:
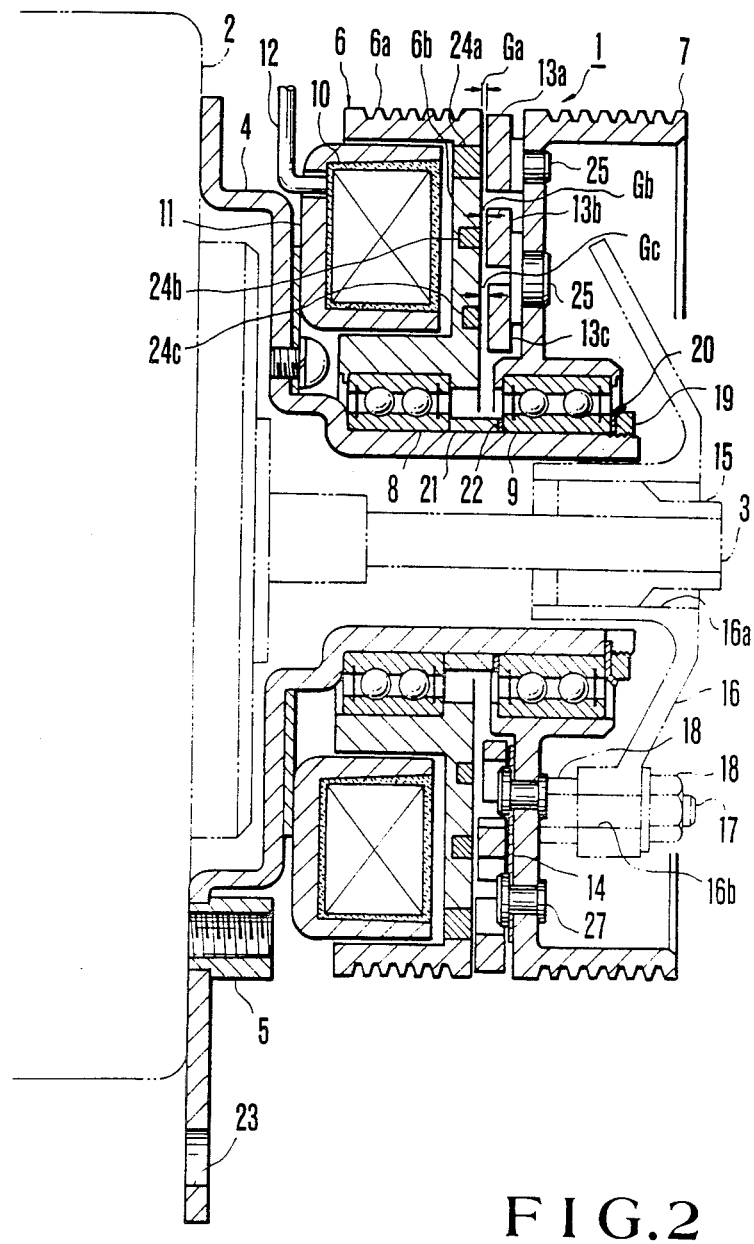
FIG. 2 is a cross sectional view taken along the line II—II of FIG. 1.
Figure 3:
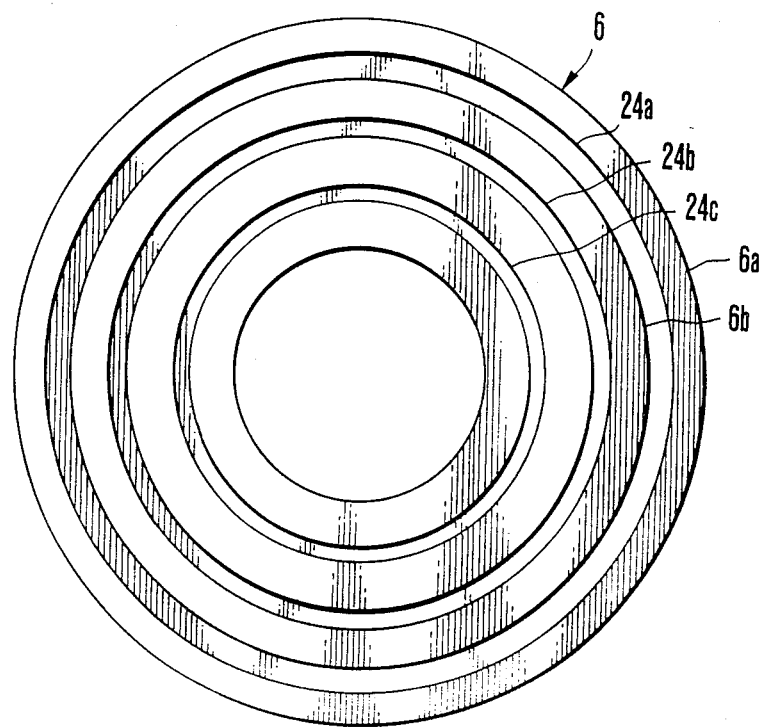
FIG. 3 is a front view illustrating an output pulley employed in the embodiment shown in FIGS. 1 and 2.

Referring to FIGS. 1 and 2, there is shown an electromagnetic clutch 1 for use on an automotive vehicle or the like. The electromagnetic clutch 1 is provided in association with an apparatus, e.g. a water pump, for a water cooled engine installed in an automotive vehicle to transmit a part of an output of the engine to an input axle 3 of the apparatus 2. A bearing holder 4 is securely attached or fastened to the apparatus 2 coaxially with the input axle 3 by means of nut members 5 into which bolts (not shown) are threadedly connected through a central housing of the apparatus 2.

The electromagnetic clutch comprises an output pulley 6 serving as a magnetic flux producing member and an input pulley 7 disposed coaxially with the output pulley 6 and adapted to be coupled therewith when the magnetic flux producing member 6 is activated. These members 6 and 7 are coaxially and rotatably supported by bearings 8 and 9 having bores into which the bearing holder 4 is forcibly inserted. The output pulley 6 comprises an outer side portion 6a along an outer peripheral surface of which there are provided a plurality of grooves for tightly supporting a belt with a plurality of grooves (not shown), and an inner side portion 6b, L-shaped in cross section, which defines a space together with the outer side portion 6a and has a friction surface opposite to the armatures described below. Within the space, a yoke 11 accommodating an excitation coil 10 for allowing the output pulley 6 to produce a magnetic flux and fixed to the bearing holder 4 is inserted with a small gap being formed between the outer and inner side portions 6a and 6b and the yoke 11. The excitation coil 10 is configured so that an excitation voltage is applied thereto by means of a lead wire 12 provided through the yoke 11.

The electromagnetic clutch 1 further comprises first, second and third armatures 13a, 13b and 13c adapted to be fastened to the input pulley 7. These armatures are disposed opposite to the output pulley 6 and are spaced therefrom in an axial direction by magnetic gaps Ga, Gb, Gc. These first, second and third armatures 13a to 13c are formed annular concentrically with each other and have diameters different from each other so that they are not in contact with each other when they are arranged to be ring-shaped in a radial direction and are coaxial with each other. The electromagnetic clutch 1 futher comprises armature supporting members, e.g., leaf springs 14 for supporting these armatures 13a, to 13c so that they are disposed coaxially with the output pulley 6 and are spaced in a radial direction to advance and withdraw them with respect to the output pulley 6 by elastic deformation of the leaf spring 14. In the FIGS. 1-4 embodiment, three leaf springs 14 are disposed circumferentially equidistantly and interposed between the armatures 13a to 13c and the output pulley 6.

There are further provided members for coupling the electromagnetic clutch 1 to the apparatus: a hub 15 having a bore into which the top end of the input axle 3 of the apparatus 2 is forcibly inserted and having an outer peripheral surface which is formed in a hexagonal shape; and a dish-shaped coupling 16 provided at its central portion thereof with a boss 16a having a hexagonal inner peripheral surface into which the hub 15 is fitted. The coupling 16 further comprises three fixing holes 16b provided at positions of its outer periphery circumferentially equidistantly divided. Stud bolts 17 adapted to be projectedly provided at the input pulley 7 are inserted into the holes 16b and are fixed thereto by means of nuts 18. A nut 19 is threadably connected to the outer end of the bearing holder 4 through a washer 20 to secure the bearing 9. A collar 21 is interposed between the bearings 8 and 9 adjacent an adjustment shim 22 for adjusting the gaps between the output pulley 6 and the first, second and third armatures 13a to 13c. Elongated holes 23 are provided in bearing holder 4 for adjusting the tension of multigrooved belts (not shown), which are tightly supported on the input pulley 7. The bearing holder 4 is fixed to a bracket of the apparatus 2 by means of bolts (not shown) inserted through the elongated holes 23.

The output pulley 6 is provided at portions opposite to the respective armatures 13a to 13c with first to third detour magnetic flux adjusting portions 24a to 24c for making a detour of a magnetic flux toward the first to third armatures 13a to 13c. These detour magnetic flux adjusting portions 24a to 24c are annular concentrically with each other as seen from a front view of the output pulley 6 shown in FIG. 3. The first detour magnetic flux adjusting portion 24a is interposed between the outer side portion 6a and the inner side portion 6b of the output pulley 6, and is made of a non-magnetic material e.g. copper or resin or the like for integrally connecting these members 6a and 6b. On the other hand, the second and third detour magnetic flux adjusting portions 24b and 24c are formed by filling a non-magnetic material in annular grooves provided along the inner side portion 6b. The placement is such that the cross sections of the first to third detour magnetic flux adjusting portions 24a to 24c become larger in a stepwise manner in the radially outward direction. Namely, the placement is effected so as to vary amounts of magnetic flux detouring toward the first to third armatures 13a to 13c in a stepwise manner. More particularly, in order that an amount of magnetic flux detouring toward the first armature 13a is larger than those of other armatures, these detour magnetic flux adjusting portions 24a to 24c are formed so that the width in a radial direction and the depth of the first detour magnetic flux adjusting portion 24a is maximum, and the widths and depths of the second and third detour magnetic flux adjusting portions 24b and 24c become small in the radially inward direction in a stepwise manner.

The above-mentioned first to third armatures 13a to 13c are retained in a direction of withdrawal with respect to the friction surface of the output pulley 6 by an elastic returning force rendered by the leaf spring 14 when they are not energized and are fitted to be in contact with stoppers 25 of rubber or the like fixed to the input pulley 7. These armatures 13a to 13c have thicknesses different from each other; i.e. the first armature 13a has the maximum thickness and the second and third armatures have thicknesses which become smaller in the radially inward direction in a stepwise manner. For this reason, the setting of the gap lengths between the first to third armatures 13a to 13c and the output pulley 6 is as follows; the gap length Ga between the first armature 13a and the output pulley 6 is minimum, and the gap length Gb between the second armature 13b and the output pulley 6 and the gap length Gc between the third armature 13c and the output pulley 6 become larger in a stepwise manner. Namely, each gap length is set such that $Ga < Gb < Gc$.

Figure 4:
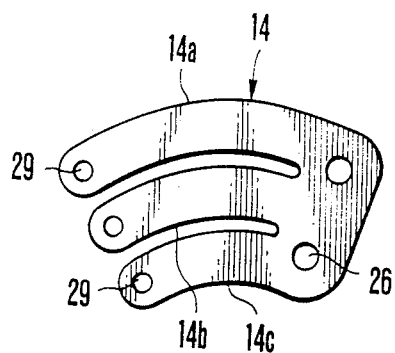
FIG. 4 is a front view illustrating a leaf spring employed in the embodiment shown in FIGS. 1 and 2.

Each leaf spring 14 is substantially sector-shaped as shown in FIG. 4. The leaf springs 14 are fixed to the input pulley 7 by means of rivets 27 which are inserted through rivet holes 26 provided at their bottom portions, respectively. Each leaf spring 14 has an outer end portion for supporting the first to third armatures 13a to 13c branching into first to third branch portions 14a to 14c so as to correspond to the armatures 13a to 13c. These branch portions 14a to 14c have widths equal to each other, and are curved concentrically with each other so that they have diameters different from each other. By forming the first to third branch portions 14a to 14c so that they are curved, the first to third branch portions 14a to 14c serving as torque transmitting members between the output an input pulleys 6 and 7 are arranged so as to correspond with a torque transmitting direction, resulting in no occurence of torsion. The leaf spring 14 is provided at the outer end portions of the branch portions with rivet holes 29 through which rivets 28 for supporting the first to third armatures 13a to 13c are inserted. The lengths from the outer end portions to the inner end portions of the respective branch portions are determined such that they decrease toward the inner direction, i.e., the length of the first branch 14a for supporting the first armature 13a is maximum, the length of the second branch 14b for supporting the second armature 13b is medium and the length of the third branch 13c for supporting the third armature 14c is minimum. In other words, the spring constants at the outer end portions of the first to third branches 14a to 14c are set such that the spring constant at the outer end portion of the first branch 14a is minimum and the spring constants at the outer end portions of the second and third branches 14b and 14c increase in a stepwise manner. In FIG. 1, reference numeral 30 denotes a bore provided through the input pulley 7 for preventing the head of the rivet 28 inserted through the second and third branch portions 14b and 14c from being in contact with the input pulley 7.

In the electromagnetic clutch thus configured, when an excitation voltage is applied to the excitation coil 10, a magnetic flux is produced around the excitation coil 10. As a result, there is formed a magnetic circuit which is initiated at the yoke 11 to route through the outer side portion 6a and the inner side portion 6b of the output pulley 6, and is terminated at the yoke 11. In this embodiment, as stated above, the first to third non-magnetic portion 24a to 24c disposed respectively opposite to the first to third armatures 13a to 13c have cross sections formed so that they increase toward the radially outward direction in a stepwise manner. Accordingly, this makes it possible that an amount of magnetic flux detouring toward the first armature 13a opposite to the first non-magnetic portion 24a having a large cross section is larger than those of the other armatures to first attract the first armature 13a toward the output pulley 6 against an elastic restoring force rendered by the first branch portion 14a, then to attract the second armature 13b at a slightly later time, and finally to attract the third armature 13c, thus completing the coupling between the output pulley 6 and the input pulley 7 to effect transmission of torque.

Further, the second and third non-magnetic portions 24b and 24c are configured so that their cross sections are smaller than the cross section of the first non-magnetic portion 24a, thus making it possible to reduce the magnetic reluctance of the magnetic circuit when the first armature 13a is attracted toward pulley 6. Accordingly, this can enlarge an amount of detour magnetic flux to obtain a necessary attraction force when the first armature 13a is initially attracted. This is also applicable to the second armature 13b. Namely, since the third non-magnetic portion 24c is configured such that its cross section is smaller than that of the second non-magnetic portion 24b, an amount of detour magnetic flux of the second armature 13b can be larger than that of the third armature 13c, thus obtaining a necessary attraction force when the second armature 13 is initially attracted.

Further, since the gap length Ga of the first armature 13a is minimum, the magnetic reluctance due to the gap is small, thus giving rise to small reduction of the magnetic force. As a result, the attraction force when the first armature 13a is initially attracted is large. In addition, since the placement is such that the first branch 14a has a small rigidity, the elastic restoring force given by the leaf spring 14 is small, resulting in no possibility that the attraction of the first armature 13a is prevented.

As stated above, the first to third detour magnetic flux adjusting portions 24a to 24c have cross sections different in a stepwise manner. Accordingly, this makes it possible to obtain a necessary attraction force for attracting the first armature 13a to be initially attracted towards the output pulley 6. Further, the setting is such that the gap lengths Ga, Gb and Gc between the first to third armatures 13a to 13c and the output pulley 6 and the spring constants of the first to third branches 14a to 14c are different in a stepwise manner, so that it is possible to effectively increase the attraction force.

Accordingly, a first stage of torque can be securely transmitted by the first armature 13a which is initially attracted. For this reason, there is no possibility that an armature to be first attracted slips or slides on the output pulley 6, resulting in a transmission of torque with it being attracted concurrently with an armature to be subsequently attracted which cannot be avoided in the prior art device. Accordingly, this prevents torque from being rapidly transmitted, thus providing a progressive coupling between the output pulley 6 and the armatures. As a result, slips or slides of an armature, particularly the first armature 13a to be first attracted can be reduced, thus suppressing heat and wear. In addition, power transmission to other auxiliary apparatus driven by the output pulley 6 through a belt with multigrooves is gradually carried out, thereby improving the life-time of the auxiliary apparatus. This makes it possible to prevent the belt with multigrooves from being seized by heat, thus ensuring safety when the invention is applied to a vehicle.

As stated above, the present invention is characterized in that a magnetic attraction force obtained by the configuration such that the dimensions of the first to third non-magnetic portions 24a to 24c are different from each other can be further effectively increased by the configuration whereby the gap lengths between the first to third armatures 13a to 13c and the output pulley 6 are different from each other, or by the configuration whereby the spring constants of the first to third branches 14a to 14c of the leaf spring 14 are different from each other. Accordingly, the present invention is not limited to the above-mentioned embodiment where the spring constants and the gap lengths are different from each other. Namely, even in the case where each spring constant of the first to third branch portions 14a to 14c is fixed, it is possible to further increase the magnetic attraction force of the first armature first attracted, which is produced at the first to third non-magnetic portions 24a to 24c by the configuration whereby the gap lengths of the first to third armatures 13a to 13c are different from each other. Likewise, even in the case where each gap length is constant, it is also possible to further increase the magnetic attraction force of the first armature 13a first attracted, which is produced at the first to third non-magnetic portions 24a to 24c by the configuration whereby the moduli of elasticity of the first to third branch portions 14a to 14c are different from each other.

Figure 5:
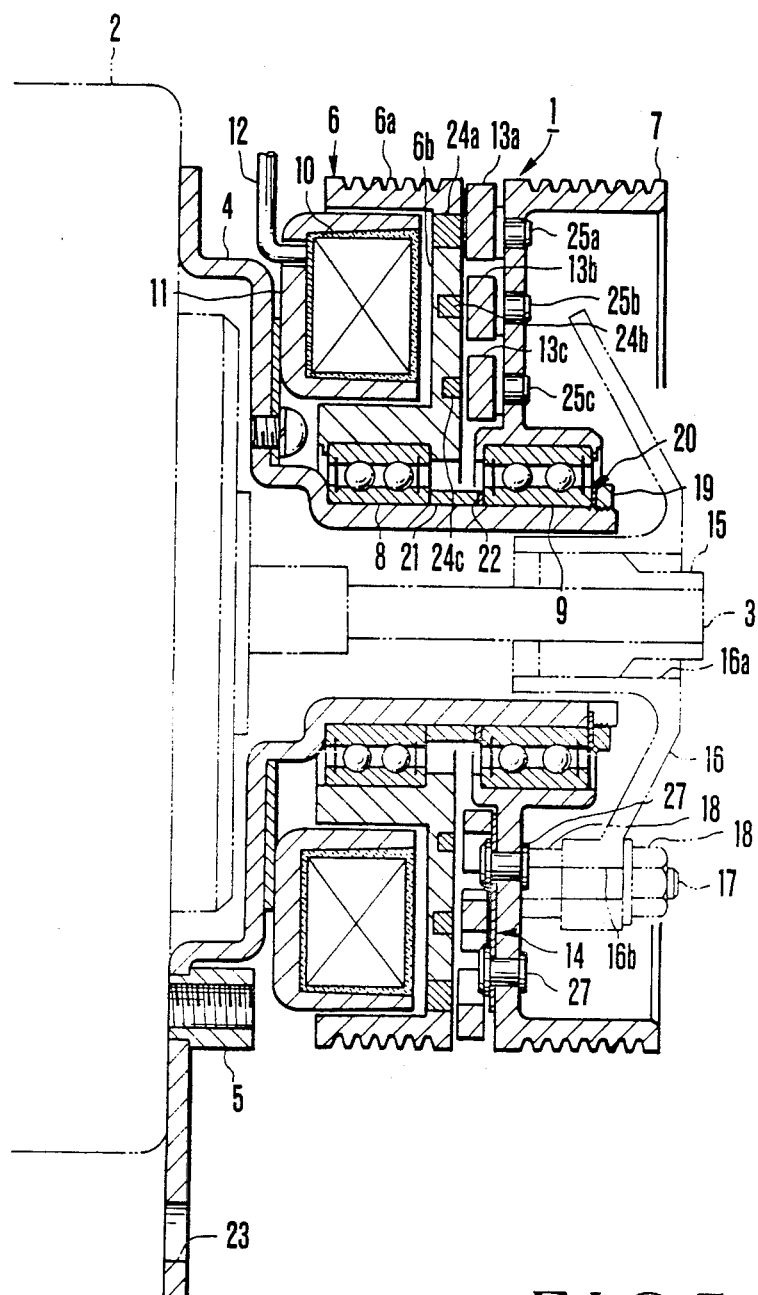
FIGS. 5, 6 and 7 are cross-sectional views illustrating other embodiments of the present invention, respectively.
Figure 6:
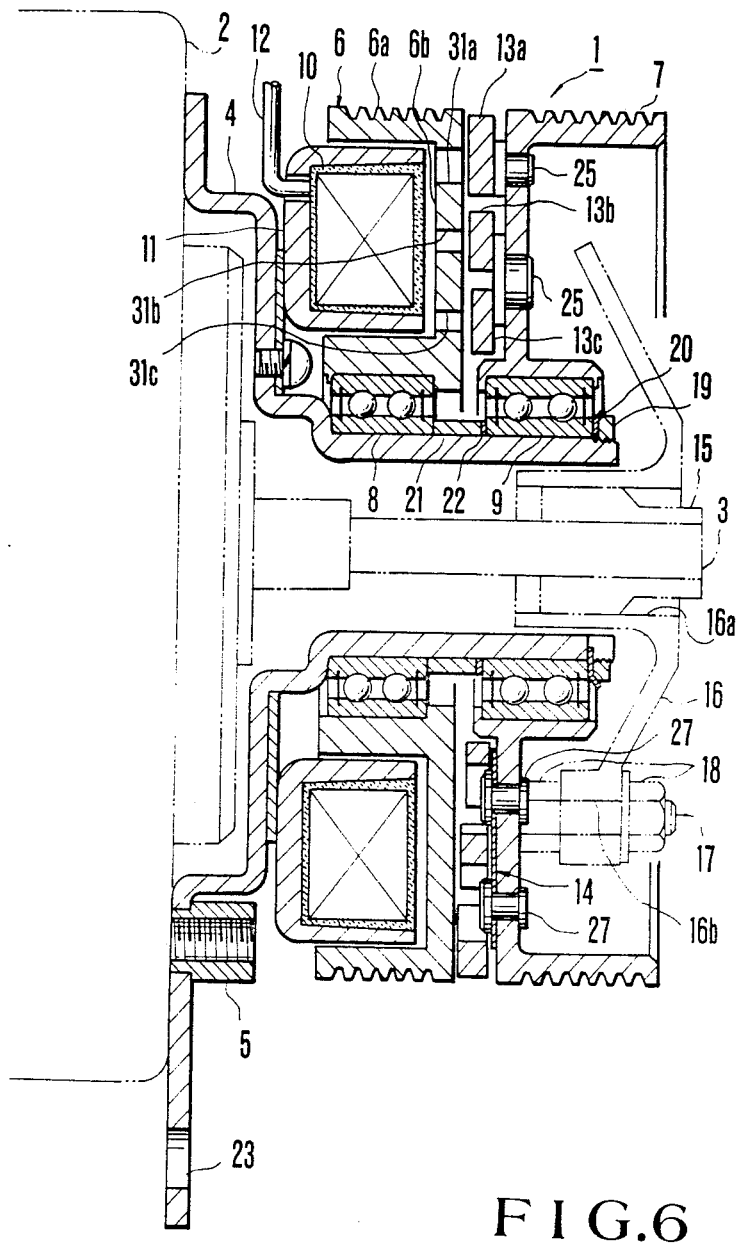
Figure 7:
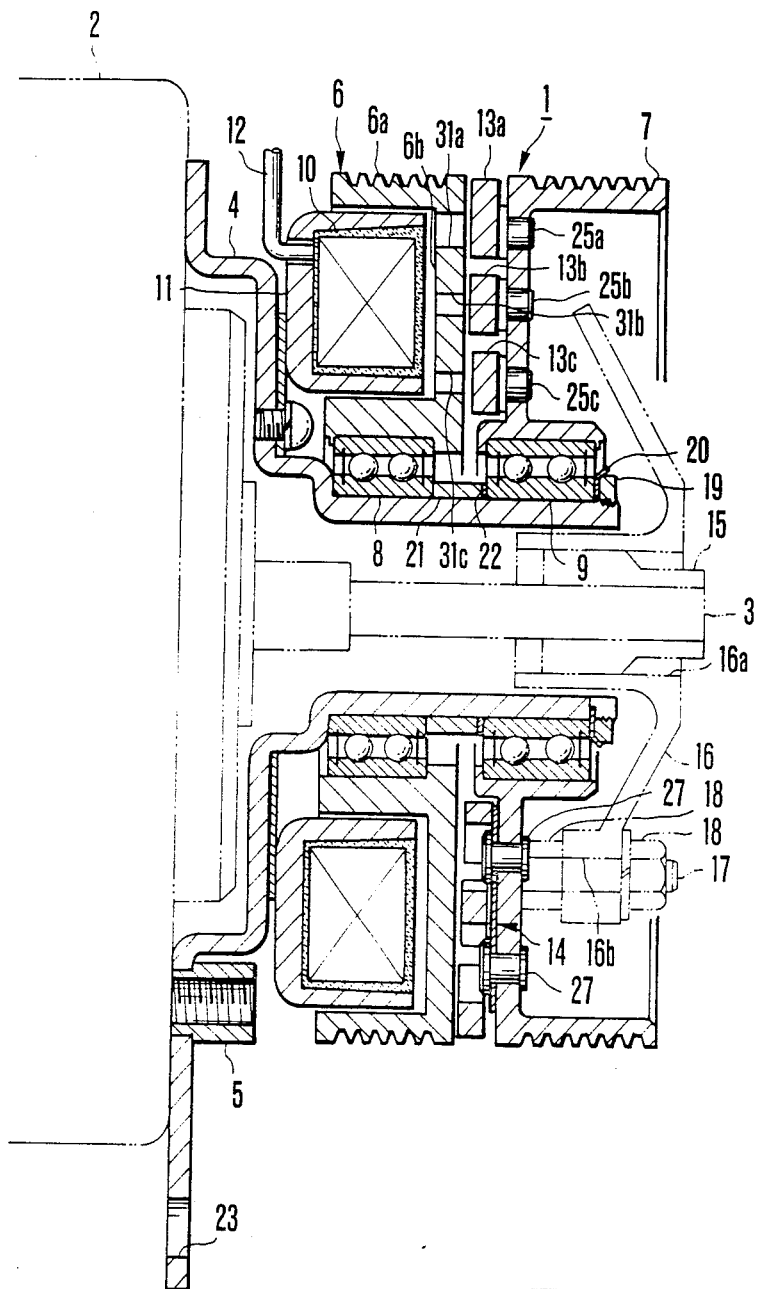

Referring to FIGS. 5 to 7, there are shown other embodiments according to the present invention wherein parts identical to those shown in FIG. 2 are designated by the same reference numerals, and their explanation will be omitted. In the embodiment shown in FIG. 5, the first to third armatures 13a to 13c have the same thickness and first to third stoppers 25a to 25c for receiving them are fixed to the input pulley 7. These stoppers 25a to 25c are configured so that the first stopper 25a has the maximum thickness and the thickness of the second and third stoppers 25b and 25c becomes smaller in a stepwise manner in the radially inward direction. By varying the thicknesses from each other, the placement is such that the gap lengths between the first to third armatures 13a to 13c and the output pulley 6 are different in a stepwise manner.

Figure 8:
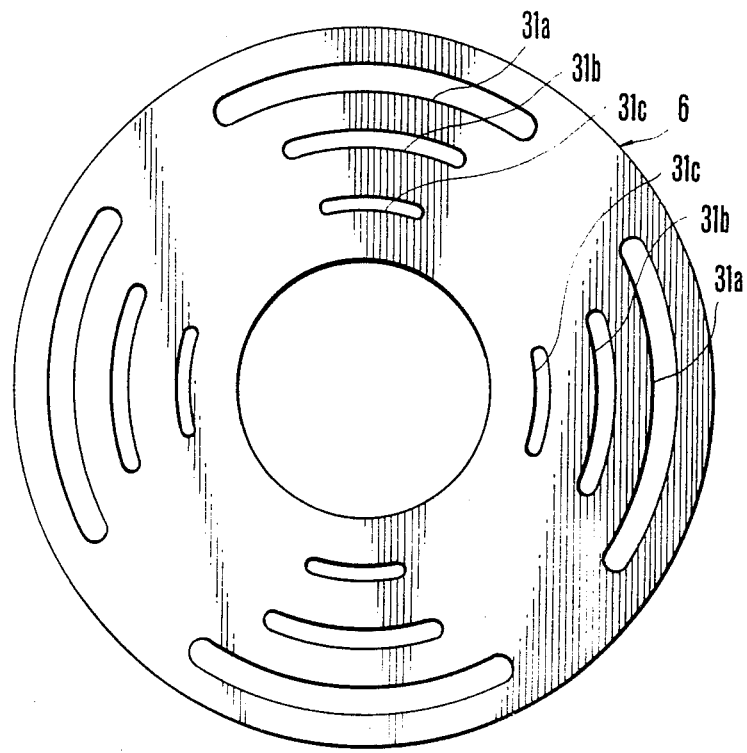
FIG. 8 is a front view illustrating an output pulley employed in the embodiments shown in FIGS. 6 and 7.
Figure 9:
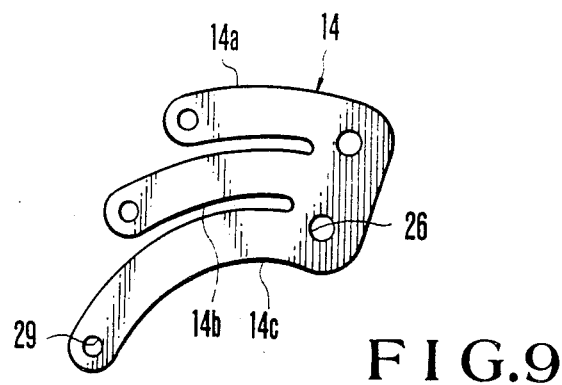
FIG. 9 is a front view illustrating another embodiment of the leaf spring member.

In the embodiment shown in FIG. 6, as seen from a front view of the output pulley 6 shown in FIG. 8, the non-magnetic portions are formed by curved circumferentially elongated holes 31a to 31c circumferentially spaced wherein they have diameters different from each other and are disposed concentrically with each other. The setting of the widths and the lengths of these elongated holes 31a to 31c is effected as follows. The width and the length of the first long hole 31a is maximum and the widths and the lengths of the second and third elongated holes 31b and 31c become smaller in a stepwise manner. In this embodiment, the non-magnetic portions are formed by making use of the characteristic that the magnetic reluctance of air is large. In this instance, it is needless to say that non-magnetic material may be filled into the first to third elongated holes 31a to 31c.

In the embodiment shown in FIG. 7, the gap lengths between the first to third armatures 13a to 13c and the output pulley 6 are determined by changing the thickness of the first to third stoppers 25a to 25c in a manner similar to the embodiment shown in FIG. 5 and the non-magnetic portions of the output pulley 6 are formed by the radially elongated holes 31a to 31c in a manner similar to the embodiment shown in FIG. 6.

In these embodiments shown in FIGS. 5 to 7, it is possible to increase the attraction force exerted on the first armature 13a first attracted to transmit torque by making use of the first armature 13a, thus providing a progressive coupling between the output pulley and the armatures.

In the above mentioned embodiments, the dimensions of the detour magnetic adjusting portions, armatures, stoppers, slots and gaps as well as spring constants are decreased toward the radially inward direction for illustration purposes only but conversely, these dimensions may obviously be decreased toward the radially outward direction to attain the same effects. For Example, it has been described that three armatures are supported so as to face the output pulley to effect a magnetic attraction from the first armature 13a radially outwardly positioned toward the armatures radially inwardly positioned in succession. However, the present invention is not limited to these embodiments. Namely, it is needless to say that a magnetic attraction may be implemented from the third armature 13c radially inwardly positioned toward the armatures radially outwardly positioned in sucession. In this embodiment, the setting of gap lengths of the first to third armatures 13a to 13c is effected so that $Ga > Gb > Gc$ and it is required to use a leaf spring 14 configured so that the relationship of the lengths la, lb and lc between the first to third branch portions 14a to 14c is $la < lb < lc$ i.e. the spring constants fa, fb and fc are selected so that $fa > fb > fc$. In this instance, only the lengths are changed in order to provide spring constants different from each other. However, instead of this, spring constants different from each other can be obtained by changing each width or thickness.

Figure 10:
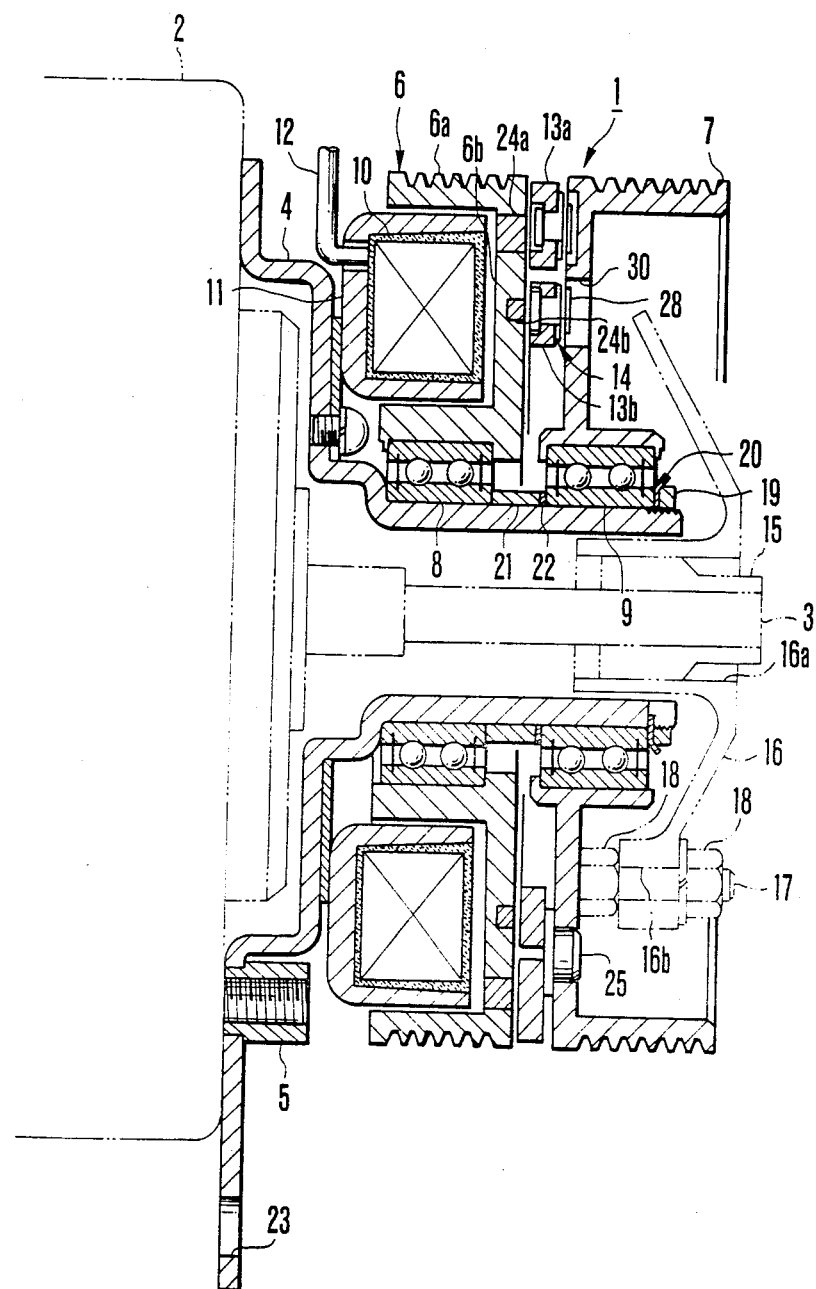
FIG. 10 is a crosssectional view illustrating a further embodiment where two armatures are provided.

Further, the present invention is not limited to the embodiment where three armatures are provided. For instance, the substantially identical advantages may be obtained by employing another embodiment where two armatures, i.e., the first and second armatures 13a and 13b, are provided as shown in FIG. 10. In this embodiment, the output pulley 6 is provided with first and second non-magnetic portions 24a and 24b corresponding to the first and second armatures 13a and 13b.

In all the above-mentioned embodiments, an electromagnetic coupling device according to the present invention is applied to an electromagnetic clutch. However, the present invention is not limited to an electromagnetic clutch application. For instance, when the apparatus 2 is used as an electric motor, by utilizing the output pulley 6 as a stationary member and attracting the first to third armatures 13a to 13c toward the stationary member, the electromagnetic coupling device of the invention may be used as an electromagnetic brake for preventing an idle revolution of the motor.

As described above in detail, the electromagnetic coupling device according to the present invention is characterized in that it is provided with a plurality of annular armatures disposed concentrically with each other so that they are supported by the top portions of leaf springs and have diameters different from each other, and in that a magnetic flux producing member is provided with non-magnetic portions provided opposite to the armatures in such a manner that their dimensions are different in a stepwise manner with respect to the armatures. Thus, this makes it possible to provide a necessary attraction force when an armature to be first attracted is initially attracted. Further, the gap lengths between the armatures and the magnetic flux producing member, and the spring constants at branch outer end portions of the armature mounting leaf springs vary in a stepwise manner, thus making it possible to further increase the attraction force.

Accordingly, it is possible to securely transmit a first stage of torque by the first armature to be first attracted, thus preventing the torque from being rapidly transmitted to provide a progressive coupling between the magnetic flux producing member and the armatures.

Further, the sizes of the non-magnetic portions are different in a stepwise manner, and the gap lengths between the magnetic flux producing member and the armatures and the spring moduli of the armature mounting leaf springs vary in a stepwise manner, thus further to strengthen the attraction force of the armature to be first attracted to advantageously provide the progressive coupling. In addition, by using a leaf spring with branch portions at its outer end portion, the number of parts can be reduced, thus lessening the assembling steps.

What is claimed is:

1. An electromagnetic coupling device comprising:
a first annular rotary member rotatable about an axis and serving as a path of a magnetic flux, one axial end of said first rotary member being flat to form a friction surface;
a yoke disposed in an inner space of said first rotary member for accommodating an excitation coil which generates said magnetic flux when energized;
a second annular rotary member disposed coaxially with said first rotary member and adapted to be coupled to rotate together therewith, one axial end of said second rotary member which opposes the axial end of said first rotary member being flat;
a plurality of annular armatures adapted to be fastened to said one axial end of said second rotary member concentrically with said first rotary member and with each other, said armatures being spaced with respect to the axial end of said first rotary member through gaps, respectively, and movable toward and away from said first rotary member;
armature supporting means provided on said one axial end of said secondary rotary member for elastically supporting said armatures in such a manner that said armatures can be sequentially contacted to and sequentially separated from the axial end of said first rotary member in accordance with the energization and the deenergization of said excitation coil, said armature supporting means including a plurality of leaf springs arranged circumferentially and equidistantly on said one axial end of said second annular rotary member, each of said leaf springs being composed of an integral portion fixed to said one axial end of said second rotary member and a plurality of branch portions each having a first end integrated into said integral portion and a free end connected with a corresponding one of said armatures, respectively, said branch portions being curved along the corresponding armatures and having substantially identical widths but different lengths which progressively vary in a discrete manner, so that the spring constants of said branch portions vary progressively in a discrete manner; and
detour magnetic flux adjusting means formed on the axial end of said first rotary member for interfering with the path of the magnetic flux in said first rotary member, said detour magnetic flux adjusting means being constituted by concentrical and annular slots formed in the axial end of the first rotary member and a non-magnetic member filled in the slots, said slots confronting said corresponding armatures and having widths and depths which are in inverse proportion to said spring constants of said branch portions which correspond to said armatures confronting said slots, respectively.

2. An electromagnetic coupling device according to claim 1, wherein said gaps between said armatures and the axial end surface of said first rotary member have dimensions which progressively vary in a discrete manner.

3. An electromagnetic coupling device according to claim 2, wherein said armatures have thicknesses which progressively vary in a discrete manner.

4. An electromagnetic coupling device according to claim 1, wherein said armatures have the same thickness, and further including stoppers mounted on said one axial end of said second rotary member for receiving said armatures, said stoppers having thicknesses which are varied progressively in a discrete manner.

* * * * *